United States Patent [19]

Youngblood et al.

[11] 4,244,810

[45] Jan. 13, 1981

[54] FLUIDIZED CATALYTIC CRACKING PROCESS FOR INCREASED HYDROGEN PRODUCTION

[75] Inventors: Douglas J. Youngblood, Lockport, Ill.; Gerald V. Nelson, Nederland, Tex.

[73] Assignee: Texaco Inc., White Plains, N.Y.

[21] Appl. No.: 102,219

[22] Filed: Dec. 10, 1979

Related U.S. Application Data

[63] Continuation of Ser. No. 918,990, Jun. 26, 1978, abandoned.

[51] Int. Cl.$^3$ .................. C10G 11/05; C10G 11/18
[52] U.S. Cl. ................. 208/120; 208/52 CT; 208/164; 252/417; 252/455 Z; 252/476; 423/651
[58] Field of Search .................. 208/113–120; 423/650–654

[56] References Cited

U.S. PATENT DOCUMENTS

| | | | |
|---|---|---|---|
| 2,844,973 | 10/1974 | Stine et al. | 208/120 X |
| 2,888,760 | 6/1975 | Ebert | 208/48 R |
| 2,998,380 | 8/1961 | McHenry et al. | 208/72 |
| 3,050,457 | 8/1962 | Wilson | 208/67 |
| 3,258,420 | 6/1966 | Dalson et al. | 423/651 X |
| 3,718,553 | 2/1973 | Stover | 208/120 |
| 3,816,298 | 6/1974 | Aldridge | 208/264 X |
| 3,923,635 | 12/1975 | Schulman et al. | 208/127 X |

OTHER PUBLICATIONS

Connor et al., "FCC Metal Contamination", IEC 49(2), 276–282, (Feb. 1957).
Gimbalo et al., "Deposited Metals Poison FCC Catalyst", Oil Gas Journal, May 15, 1972, pp. 112, 114, 116, 120, 122.

*Primary Examiner*—Delbert E. Gantz
*Assistant Examiner*—G. E. Schmitkons
*Attorney, Agent, or Firm*—Carl G. Ries; Thomas H. Whaley; James L. Bailey

[57] ABSTRACT

A fluidized catalytic cracking process for conversion of hydrocarbon charge to cracked products wherein a regenerated fluidized catalytic cracking catalyst having deposited thereon about 1000 to 10,000 ppm of nickel, vanadium, iron or mixtures thereof is treated with a sodium compound prior to use for cracking hydrocarbon charge such that hydrogen yield is increased.

4 Claims, No Drawings

FLUIDIZED CATALYTIC CRACKING PROCESS FOR INCREASED HYDROGEN PRODUCTION

This is a continuation of application Ser. No. 918,900, filed June 26, 1978 (now abandoned).

BACKGROUND OF THE INVENTION

1. Field of the Invention

The present invention relates to fluidized catalytic cracking of hydrocarbon charge stocks. More particularly, it relates to fluidized catalytic cracking wherein a substantial portion of the hydrocarbon charge is converted to hydrogen and wherein said hydrogen is recovered substantially free of contaminant gases, particularly nitrogen.

2. Discussion of Prior Art

Fluidized catalytic cracking of hydrocarbon liquids ranging from naphtha through residuum stocks is well known. In such processes, a portion of the hydrocarbon charge is converted to hydrogen and low molecular weight hydrocarbons such as methane, ethylene and ethane. Although the weight percent of charge converted to hydrogen is small (in the range of 0.5–2 wt. percent), the volume of hydrogen is considerable, considering the low molecular weight of hydrogen and the total weight of hydrocarbon charge to a fluidized catalytic cracking unit. That is, the hydrogen yield from a fluidized catalytic cracking unit charging 100,000 B/D hydrocarbon is in the range of 1.5 to 10 million SCF/D hydrogen. This hydrogen is, however, contaminated with other light gases, such as $C_1$–$C_2$ hydrocarbons, nitrogen, carbon monoxide, carbon dioxide and hydrogen sulfide. Also, the hydrogen is recovered at a relatively low pressure. Heretofore recovery of the hydrogen as a product has not been economical, but with increased energy costs, such hydrogen recovery is more attractive.

In copending application Ser. No. 918,989, filed June 26, 1978 (now U.S. Pat. No. 4,206,038), a method for stripping hot, regenerated catalyst with an acid gas, such as $CO_2$ and/or $H_2S$ is disclosed wherein nitrogen and carbon monoxide contaminants are prevented from entering a fluidized catalytic cracking reaction zone, such that subsequently, hydrogen product may be recovered free of such non-condensible gases. Consequently, hydrogen of commercial purity may be recovered from a fluidized catalytic cracking unit.

Cracking hydrocarbon charge stocks in Fluidized Catalytic Cracking units in the presence of cracking catalysts contaminated with metals such as iron, nickel and vanadium for production of hydrogen-rich gas streams is known. For example, see U.S. Pat. Nos. 2,998,380 and 3,050,457. In such processes, low quality charge stocks such as residuum containing compounds of nickel, iron, and vanadium are cracked at low or high severities for producing gas streams rich in hydrogen and for producing cycle oils free of metal contaminants.

In many fluidized catalytic cracking processes, particularly those charging low quality charge stocks, such as metals contaminated residuum, increased hydrogen yields are desirable. Particularly in situations where such hydrogen may be employed in other refining processes.

SUMMARY OF THE INVENTION

Now according to the present invention, we have discovered an improvement in fluidized catalytic cracking such that hydrogen yield from cracking a hydrocarbon charge may be substantially increased.

In a fluidized catalytic cracking process employing an embodiment of the present invention, wherein hydrocarbon charge and regenerated fluidized cracking catalyst are contacted in a reaction zone under cracking conditions for production of cracked vapors and coke contaminated spent catalyst, wherein said cracked vapors recovered from said reaction zone are fractionated in a main fractionation zone into one or more liquid fractions such as a naphtha fraction and a light cycle gas oil fraction, and into a first gas fraction comprising hydrogen and light hydrocarbons, wherein spent catalyst from said reaction zone is regenerated in a regeneration zone by burning coke therefrom with air and wherein hot regenerated catalyst from said regeneration zone is contacted with additional hydrocarbon charge in said reaction zone; the improvements of the present invention which comprise:

(a) maintaining, as deposits upon said regenerated catalyst exiting said regeneration zone, compounds of metals selected from the group consisting of nickel, iron, vanadium, and mixtures thereof in an amount equivalent to about 1000 to 10,000 ppmw, calculated as metals; and (b) maintaining, as a deposit upon said regenerated catalyst exiting said regeneration zone, compounds of sodium in an amount equivalent to about 0.1 to 1 times the weight of nickel, iron and vanadium deposited upon said regenerated catalyst for increasing hydrogen production activity of said catalyst.

The major advantage of this process comprises production from a fluidized catalytic cracking process of substantial amounts of hydrogen from low value charge stocks. An additional advantage is that cycle gas oil produced from metals containing charge stocks are recovered essentially free of metals contamination. These advantages and others will be discussed in the detailed description which follows.

DETAILED DESCRIPTION

Hydrocarbon charge stocks commonly charged to fluidized catalytic cracking units, and which may be employed in the process of the present invention, comprise relatively low value hydrocarbons which can be cracked to more valuable compounds. Such charge stocks are generally petroleum fractions, or whole crudes and range from naphtha boiling range materials through residuum. Hydrocarbons from other sources, such as tar sands, shale oil, coal liquids, etc. may also serve as hydrocarbon charge stocks. Hydrocarbon charge stocks for fluidized catalytic cracking units generally contain sulfur compounds, and heavier charge stocks contain compounds of metals such as nickel, vanadium, iron and copper. A substantial portion of the sulfur compounds in hydrocarbon charge stocks are converted to hydrogen sulfide in the cracking process. Substantially all the metal compounds are deposited upon the cracking catalyst. Preferably, charge stocks contaminated with nickel, iron and vanadium are charged to the process of the present invention.

Generally, in fluidized catalytic cracking processes, the purpose is to produce more valuable, or useful, products from less valuable charge stocks. For example, products such as olefins, naphthas of increased octane number, light cycle gas-oils for fuel, etc., are desired products. However, a significant portion of the hydrocarbon charge stocks are converted to "dry" gases which include hydrogen, methane, ethylene and ethane. Heavier charge stocks particularly, such as atmospheric residuum and/or vacuum residuum tend to produce large amounts of dry gas and coke when subjected to fluidized catalytic cracking. Although hydrogen of sufficient purity and high pressure is a valuable commodity, it has heretofore not been economically justifiable to purify and compress hydrogen from fluidized catalytic cracking units. Consequently, the dry gas products from fluidized catalytic cracking units have commonly been utilized as fuel gas in refining processes.

With increases in energy prices, the value of hydrogen has risen, such that, in many instances, it is economically feasible to purify and compress the hydrogen produced from fluidized catalytic cracking units. Light hydrocarbons and acid gases are removable from the hydrogen by conventional gas purification techniques. However, "non-condensible" gases, such as nitrogen, carbon monoxide, etc., which appear in product effluent from a fluidized catalytic cracking reaction zone as carryover from the regeneration zone, are more difficult to remove.

Catalyst utilized in fluidized catalytic cracking processes comprises particles of acidic oxides having small size (10-100) and large surface areas. Such catalyst may comprise amorphous compounds such as silicia-alumina, silica-zirconia, silica-magnesia, etc., or may comprise crystalline zeolitic alumino-silicates or combinations thereof. The zeolitic catalysts are compounds of silica and alumina with other metals forming three dimensional crystals having pores of regular cross-sectional area. A large variety of such zeolitic catalysts are known and described in the literature, and such catalysts are widely used commercially in fluidized catalytic cracking processes. Generally, zeolitic catalysts are mixed with amorphous base materials, such as silica-alumina, etc., to form the commercial catalysts. All commercial cracking catalysts, whether zeolitic, amorphous, or combinations thereof, contain voids or pores. In fluidized catalytic cracking processes wherein hydrocarbon charge stocks containing metals (such as nickel, vanadium, iron, copper, etc) are processed, the metals are deposited upon the catalyst. As the amount of metals deposited upon the catalyst increases, the cracking activity of the catalyst decreases. Consequently, metals contaminated catalyst is withdrawn from the process and fresh catalyst is added to maintain catalyst having a selected equilibrium metals content, and having desired activity for contact with hydrocarbon charge.

In the process of the present invention, amorphous catalysts, particularly amorphous silica-alumina catalysts are preferred. Such catalysts, when contaminated with metals such as nickel, vanadium, and iron tend to produce relatively large proportions of dry gas (eg. hydrogen and $C_1$-$C_2$ hydrocarbons), compared to zeolitic catalysts. Additionally, such amorphous catalysts, contaminated with nickel, vanadium and iron and when treated with sodium or other alkali metals, according to the process of the present invention, produce additional hydrogen at the expense of $C_1$-$C_2$ range hydrocarbons.

In fluidized catalytic cracking, hydrocarbon charge is contacted with hot, regenerated catalyst in a reaction zone, under cracking conditions, whereupon the hydrocarbon charge is vaporized and cracked. A portion of the charge remains unvaporized and deposits upon the catalyst as coke. Metals such as nickel, vanadium and iron, from the hydrocarbon charge, also deposit upon the catalyst. Presence of coke decreases the activity of the catalyst, and such coke deactivated catalyst is referred to as spent catalyst. Commonly, spent catalyst from a reaction zone is stripped, in a spent catalyst stripping zone, with steam for removing any volatile materials therefrom, and the stripped catalyst is transferred to a regeneration zone. In the regeneration zone, catalyst undergoing regeneration is maintained as a fluidized bed with upward flowing air, at an elevated temperature in the range of 1000°-1500° F. and at pressures in the range of 5-50 psia. Under such conditions, coke is burned with oxygen in the air to form carbon oxides and water. Nickel, iron and vanadium remains upon the regenerated catalyst. Regenerated catalyst is withdrawn from the fluidized bed into a regenerated catalyst standpipe from which the regenerated catalyst flows for contact with additional hydrocarbon charge in the reaction zone. Regenerated catalyst in the regenerated catalyst standpipe has combustion gases, primarily nitrogen, entrained between the particles and within the pores of the catalyst.

Thus nitrogen, carbon monoxide, and other "non-condensible" gases enter the products of fluidized catalytic cracking processes via entrainment with regenerated catalyst. As the amount of catalyst circulated is relatively large (about 1 to 20 pounds catalyst per pound of charge) the amount of "non-condensible" gases entering the reaction zone is also relatively large. These entrained gases exit the reaction zone with cracked hydrocarbon vapors and are recovered with the light gas fraction of the cracked products. The water is condensed, and carbon dioxide is easily removed by acid gas treating means. Nitrogen and carbon monoxide are inert, and exit the cracking process with the mixture of hydrogen and light hydrocarbons. Methane, ethylene, and ethane are removable from the hydrogen by such gas purification means as cryogenic liquefication, etc. However, the nitrogen and carbon monoxide tend to remain with the hydrogen. Sufficient nitrogen is commonly present to substantially dilute the hydrogen, and carbon monoxide is a catalyst poison. According to the process of the copending application Ser. No. 918,989, filed June 26, 1978, (now U.S. Pat. No. 4,206,038) a method of stripping regenerated catalyst with an acid gas, such as carbon dioxide and/or hydrogen sulfide is disclosed for eliminating carry-over of nitrogen and carbon monoxide into the hydrogen product stream of a fluidized catalytic cracking unit such that the hydrogen product stream is of sufficient purity for commercial utility.

Accordingly, regenerated catalyst, having combustion gases entrained therein, is withdrawn from the regeneration zone into a regenerated catalyst stripping zone. In the regenerated catalyst stripping zone, the regenerated catalyst is contacted with a selected stripping gas in an amount sufficient to strip combustion gas from the catalyst. This stripping gas should be supplied in amounts within the range of about 30-90 SCF stripping gas per 1000 pounds of catalyst, and the regenerated catalyst stripping zone must be of sufficient cross-sectional area to accommodate this flow of gas without entraining the catalyst. Regenerated catalyst stripping zone vapor flow rates contemplated herein are within the range of about 1-6 ft/sec. The gases useful for stripping regenerated catalyst are those conveniently removable from the subsequent hydrogen product and preferably are selected from acid gases consisting of carbon dioxide, hydrogen sulfide, and mixtures thereof.

These stripping gases must be separable from the hydrogen product and must be easily disposed of. Light hydrocarbons would be satisfactory, except for their cost, and that a substantial portion would be lost from the regenerated catalyst stripper overhead. Steam, in high concentrations, deactivates the cracking catalyst.

Metals, such as nickel, iron and vanadium present upon the spent catalyst remain on the regenerated catalyst. These metals reduce catalyst cracking activity and selectivity for production of cracked hydrocarbon liquids. Consequently, a portion of the spent catalyst is commonly withdrawn and replaced with fresh catalyst for maintaining an equilibrium concentration of iron, nickel, and/or vanadium of less than about 10,000 ppmw upon the regenerated catalyst. At higher metals concentration, cracking activity of the catalyst is reduced to an uneconomic level.

According to the method of the present invention, a regenerated equilibrium catalyst having from about 1000 to about 10,000 ppmw of nickel, iron and/or vanadium deposited thereon is treated with a sodium compound, for example NaOH, $Na_2CO_3$ and/or NaCl, in an amount equivalent to about 0.1 to 1.0 times the concentration of nickel, iron, and vanadium upon the equilibrium catalyst. The presence of sodium upon the cracking catalyst in conjunction with nickel, iron, and vanadium increases the concentration of hydrogen in the dry gas stream compared to equilibrium catalyst which are not treated with sodium. The hydrogen concentration increase, when employing the process of the present invention, is at the expense of $C_1$-$C_2$ hydrocarbons produced in the cracking process.

Such nickel, iron and/or vanadium containing equilibrium catalysts may likewise be treated with other alkali metals, such as lithium or potassium. Increases in hydrogen yield may, however, not be commensurate with hydrogen yield increases experienced upon sodium treatment of the catalyst.

Catalysts preferred for use in the process of the present invention are amorphous cracking catalysts, particularly amorphous silica-alumina catalysts containing from about 10 to 30 wt. percent alumina, and containing as contaminants thereon from about 1000 to about 10,000 ppmw of metals selected from the group consisting of nickel, iron, vanadium and mixtures therof. At contaminant metal concentrations less than about 1000 ppmw, the hydrogen generating capacity of the catalyst is not substantially affected by treatment with sodium. At contaminated metals concentrations greater than 10,000 ppmw, catalyst conversion activity is severly reduced. Preferably, iron, nickel, and/or vanadium deposits upon catalyst are maintained in the range of about 1000 to 5500 ppmw and sodium/heavy metals weight ratios of about 0.5/1 are maintained for obtaining optimum yields of hydrogen, naphtha and light cycle oil.

Other cracking catalysts, such as those containing alumino-silicate zeolites ion exchanged with divalent metals, trivalent metals, and/or hydrogen may be employed in the process of the present invention. However, hydrogen yield from such zeolitic catalysts is not as high as hydrogen yield from amorphous silica-alumina catalysts.

Often, hydrocarbon charge stocks to fluidized catalytic cracking processes contain compounds of nickel, vanadium, and iron which deposit upon the catalyst in the cracking reaction. Such metals deposits upon the catalyst increase as the catalyst is regenerated and recycled for contact with additional charge stock. Such metals tend to reduce activity and selectivity of cracking catalysts such that, as metals content increases, coke production and dry gas production (including hydrogen) increases and naphtha production and light cycle gas oil production declines. In such situations, for the present invention, a portion of the circulating catalyst is withdrawn and replaced with fresh catalyst such that metals contamination of the catalyst is maintained at an equilibrium value in the range of about 1000 to 10,000 ppmw. At such levels, deactivation of catalyst as a result of metals contamination is not economically severe. According to the present invention, such catalysts, containing equilibrium concentration of metals, may be treated with compounds of sodium for increasing hydrogen production from the cracking reaction.

In the method of the present invention, sodium in the form of sodium carbonate, sodium hydroxide, sodium chloride, or other compounds of sodium, is contacted with equilibrium cracking catalyst to maintain a weight ratio of sodium to the total of iron, nickel and vanadium in the range of about 0.1/1 to about 1/1. Iron, nickel and vanadium may accumulate upon the catalyst from a metal containing hydrocarbon charge as it is continuously circulated through the cracking process or compounds of such heavy metals may be added to the process for increasing their concentration upon the catalyst. Such heavy metals appear to be stable, remaining upon the catalyst. Sodium, and other alkali metals, are less stable, and unless added from time to time, tends to be removed from circulating catalyst. Conveniently, sodium (as sodium compounds) is added to the cracking catalyst as a component of the hydrocarbon charge, however the sodium may be added at any convenient location within a fluidized cracking process.

For a hydrocarbon charge contacted with an equilibrium catalyst, hydrogen and $C_1$-$C_2$ hydrocarbon production increases as the concentration of iron, nickel and vanadium on the equilibrium catalyst increases within the given range. According to the present invention, hydrogen production compared to $C_1$-$C_2$ hydrocarbon production increases further as the amount of sodium added to the process, relative to the amount of iron, nickel, and vanadium present on the catalyst increases within the range disclosed herein. Sodium deposited on a cracking catalyst which does not contain heavy metals results in a decline in catalyst activity, but does not affect selectivity. However, advantageously, sodium added to a heavy metals containing equilibrium catalyst increases yields of hydrogen relative to the yield of $C_1$-$C_2$ hydrocarbons. Increasing the amount of sodium relative to the amount of iron, nickel, and vanadium upon equilibrium cracking catalyst, within the weight ratios disclosed herein, further increases hydrogen yield.

The addition of sodium to equilibrium cracking catalysts, containing iron, nickel and vanadium contaminants, increases hydrogen concentration in the light gas fraction from a fluidized catalytic cracking unit, but also decreases catalytic activity and selectivity for producing cracked liquid products. Consequently, an economic balance between increased hydrogen yield and decreased cracked liquid yield must be struck. The concentration of iron, nickel, and vanadium upon equilibrium catalyst may be adjusted within the range of about 1000–10,000 ppmw and the weight ratio of sodium to iron, nickel and vanadium may be adjusted within the range of about 0.1/1 to about 1/1 for obtaining a desired balance of hydrogen yield and cracked liquid yield. Advantageously, a low value hydrocarbon charge stock, such as residuum, which produces low quality cracked liquid products, may be charged to the process of the present invention, such that the economics of hydrogen production are favored.

In some cases, hydrocarbon charge stocks for fluidized catalytic cracking units will not contain iron, nickel or vanadium compounds. Consequently, such metals do not have an opportunity to accumulate upon the catalyst. In this circumstance, compounds of iron, nickel, vanadium, or mixtures thereof may be added to the catalyst, such that upon sodium addition, hydrogen production may be increased. Under such circumstances where metals contaminants are added to the catalyst, it must be understood that conversion activity and selectivity for liquid products of the catalyst may be adversely affected compared to uncontaminated catalyst.

According to the process of the present invention catalyst containing iron, nickel and/or vanadium compounds and treated with sodium compounds is contacted with a hydrocarbon charge following regeneration of such catalyst, in a fluidized catalytic cracking reaction zone at a temperature of about 850°–1300° F., and a pressure of about atmospheric to 50 psig. The reaction zone may contain a fluidized bed of catalyst for contact with hydrocarbon charge; may comprise a riser transport reaction zone wherein hydrocarbon charge and catalyst are contacted under dilute phase conditions; or may be a combination of dilute phase riser transport contact and dense phase bed contact. Upon reaction, cracked vapors are separated from coke contaminated spent catalyst. The spent catalyst is regenerated in a regeneration zone and the cracked vapors are separated into product fractions in a main fractionation zone. Hydrogen is recovered, by gas recovery techniques, from the lightest product fraction from the main fractionation zone. Copending application Ser. No. 918,989, filed June 26, 1978 (now U.S. Pat. No. 4,206,038) discloses an improved method for recovering hydrogen of commercial purity in a fluidized catalytic cracking process.

EXAMPLE

In order to demonstrate the process of the present invention, a series of comparative cracking runs were carried out on a laboratory scale, batch cracking unit. Cracking conditions for all runs were 920° F., 2.0 lbs oil/hr/lb. catalyst, 1.0 cat/oil ratio, and under bed cracking conditions. The charge stock employed in each run was an atmospheric gas oil having properties shown in Table I.

TABLE I

|  | Charge Stock Properties |
|---|---|
| Gravity, °API | 36.7 |
| Sulfur, wt. % | 0.08 |
| Conradson Carbon, wt. % | 0 |
| Bromine No. | 3 |
| Sodium, ppmw | 0.68 |
| Heavy metals, ppmw | |
| Ni | <0.1 |
| Fe | <0.1 |
| V | <0.1 |
| Cu | <0.1 |
| Cr | 2 |
| ASTM Distillation, °F. | |
| IBP/5% | 444/480 |
| 10120 | 493/512 |
| 30/40 | 526/538 |
| 50 | 552 |
| 60/70 | 566/582 |
| 80/90 | 607/646 |
| 90/EP | 686/708 |

In this experiment, four runs were made:

RUN 1, with no metals added to fresh catalyst and with heat deactivation at 1700° F. for seven (7) hours for tempering catalyst activity to approximate the activity of an equilibrium cracking catalyst;

RUN 2, the heat deactivated catalyst of run 1, treated with NaCl solution to deposit about 2800 ppmw Na on catalyst, then dried at 1000° F.;

RUN 3, fresh catalyst treated with $NH_4VO_3$ and $Ni(C_2H_3O_2)_2$ to deposit about 2500 ppmw Ni and 3000 ppmw V upon the catalyst, followed by heat deactivation at 1700° F. for seven (7) hours; and RUN 4, the catalyst of run 3, treated with NaCl solution to deposit about 2600 ppmw Na upon the catalyst and dried at 1000° F. All runs 1 through 4, were with the charge stock of Table I, and at the same cracking temperature, liquid hourly space velocity and catalyst to oil ratio, as described above.

Run 1 was performed to present a base case, with no metals added to the fresh catalyst.

Run 2 was performed to demonstrate the effect upon hydrogen production of sodium added to the catalyst, without the presence of added heavy metals.

Run 3 was performed to demonstrate the effect upon hydrogen production of heavy metals (Ni+V) added to the catalyst, without the presence of added sodium.

Run 4 was performed to demonstrate the effect upon hydrogen production of heavy metals (Ni+V) and sodium added to the catalyst.

Operating conditions and results of each run are shown in Table II, following:

TABLE II

| | AMORPHOUS SILICA-ALUMINA, CONTAINING 13.0 WT. % ALUMINA | | | |
|---|---|---|---|---|
| Run No. | 1 | 2 | 3 | 4 |
| | | Heat deactivated 1700° F., 7 hrs. | $NH_4VO_3$ & $Ni(C_2H_3O_2)_2$ | $NH_4VO_3$ & $Ni(C_2H_3O_2)_2$ Heat deactivated 1700° F., 7 hrs. |
| Catalyst Treatment | Heat deactivated 1700° F., 7 hrs. | NaCl solution, dried, 1000° F. | Heat deactivated 1700° F., 7 hrs. | NaCl solution dried, 1000° F. |
| CATALYST ANALYSIS | | | | |
| Metals, ppmw | | | | |
| Na | 200 | 2800 | 100 | 2000 |
| Ni | 100 | 100 | 2500 | 2500 |
| Fe | 600 | 600 | 500 | 500 |
| V | 80 | 80 | 3000 | 2900 |
| Pore Volume, cc/gm | 0.15 | 0.14 | 0.12 | 0.12 |
| Surface Area m²/gm | 69 | 66 | — | — |
| Activity | 19.9 | 15.7 | 10.4 | 8.9 |

TABLE II-continued

| | AMORPHOUS SILICA-ALUMINA, CONTAINING 13.0 WT. % ALUMINA | | | |
|---|---|---|---|---|
| Run No. | 1 | 2 | 3 | 4 |
| Catalyst Treatment | Heat deactivated 1700° F., 7 hrs. | Heat deactivated 1700° F., 7 hrs. NaCl solution, dried, 1000° F. | $NH_4VO_3$ & $Ni(C_2H_3O_2)_2$ Heat deactivated 1700° F., 7 hrs. | $NH_4VO_3$ & $Ni(C_2H_3O_2)_2$ Heat deactivated 1700° F., 7 hrs. NaCl solution dried, 1000° F. |
| Reactor, Temp. °F. | 920 | 920 | 920 | 920 |
| WHSV, wt. oil/hr/wt.cat. | 2.0 | 2.0 | 2.0 | 2.0 |
| Cat. oil ratio, wt./wt | 1.0 | 1.0 | 1.0 | 1.0 |
| Conversion, wt. % | 25.3 | 19.5 | 14.4 | 12.5 |
| Coke,wt. % chg. | 0.5 | 0.3 | 1.62 | 1.17 |
| Gas SCF/BBL | 216.5 | 176 | 320 | 274 |
| Gas Purity, Vol. %$H_2$ | 38.5 | 38.5 | 81.2 | 84.2 |

Comparing results from runs 1–4, Table II, the following are noted. Comparing runs 1 and 2, it is seen that addition of sodium results in loss of catalyst activity with no increase in hydrogen production. Comparing runs 1 and 3, it is seen that addition of heavy metals (Ni+V), results in loss of catalyst activity, increase in coke and gas yield, and increase in hydrogen yield and purity. Comparing run 4 with runs 1,2, and 3 it is seen that addition of Na to heavy metals contaminated catalyst results in some catalyst deactivation, and results in increased hydrogen production at the expense of other light gases, as evidenced by increased hydrogen purity.

EXAMPLE 2

In order to demonstrate the effect of increasing deposition of sodium upon heavy metals containing equilibrium catalyst, comparative runs 5 and 6 were carried out on the laboratory scale, batch fluidized cracking unit of Example 1. Cracking conditions for runs 5 and 6 were 920° F., 2.0 lbs. oil/hr/lb. catalyst, 1.0 catalyst/oil ratio, and with bed cracking conditions. The catalyst was an amorphous silica-alumina catalyst containing 17.9 wt. % alumina, obtained as equilibrium catalyst, having metals deposited thereon, from a commercial fluidized catalytic cracking unit. Hydrocarbon charge stock employed in both runs 5 and 6 was the atmospheric gas oil shown in Table I, above.

Sodium and heavy metals concentration increases upon the equilibrium catalyst from runs 5 to 6. The amount and purity of hydrogen in the light gas fraction likewise progressively increase. Operating conditions and results of each run are shown in Table III, following.

TABLE III

| Run No. | 5 | 6 |
|---|---|---|
| Catalyst | Equilibrium amorphous silica-alumina fluid catalytic cracking Containing 17.9 wt. % $Al_2O_3$ | |
| Catalyst Analysis | | |
| Metals, ppmw | | |
| Na | 2300 | 2800 |
| Ni | 150 | 170 |
| Fe | 3700 | 4500 |
| V | 180 | 180 |
| Pore volume cc/gm | 0.35 | 0.35 |
| Surface area, m²/gm | 93 | 93 |
| Activity | 17.5 | 16.3 |
| Reactor temp., °F. | 920 | 920 |
| WHSV,lb.oil/hr/lb.cat | 2.0 | 2.0 |
| Cat/oil ratio, lb/lb | 1.0 | 1.0 |
| Conversion,wt. % of charge | 23.1 | 22.6 |
| Coke,wt. % of charge | 0.63 | 0.73 |
| Gas, SCF/BBL | 261 | 274 |

TABLE III-continued

| Run No. | 5 | 6 |
|---|---|---|
| Gas Purity, Vol. %$H_2$ | 44.16 | 55.8 |

From examining results from runs 5 and 6 it is seen that as heavy metals concentration upon the equilibrium catalyst increases, the amount of light gases produced increases. Also, as the amount of sodium increases, the concentration of hydrogen in the light gases increases.

Thus from the above specification and example, addition of sodium to a heavy metal contaminated catalyst increases hydrogen content of the dry gas fraction recovered from a fluidized catalytic cracking unit. Whereas, addition of sodium to a cracking catalyst free of heavy metals does not increase hydrogen production from the cracking reaction.

The above specification and examples are exemplary of the present invention, and many modifications and variations will be obvious to those skilled in the art, which modifications and variations are within the spirit and scope of the present invention. Therefore the only limitations intended for the present invention are those included within the appended claims.

We claim:

1. In a fluidized catalytic cracking process wherein hydrocarbon charge and regenerated catalyst are contacted at fluidized cracking conditions using a crystalline zeolitic alumina-silicate cracking catalyst or an amorphous silica-containing cracking catalyst or a mixture thereof in a reaction zone for production of cracked vapors and coke contaminated spent catalyst, wherein said cracked vapors, recovered from said reaction zone, are fractionated in a fractionation zone into at least a gas fraction comprising hydrogen and light hydrocarbons and one or more liquid hydrocarbon fractions, wherein said spent catalyst from said reaction zone is regenerated by burning coke therefrom with air in a regeneration zone for production of regenerated catalyst, and wherein hot regenerated catalyst from said regeneration zone is returned to said reaction zone for contact with additional hydrocarbon charge; the improvement comprising;

(a) adding in said fluidized catalytic cracking process compounds of metals selected from the group consisting of nickel, vanadium, iron and mixtures thereof sufficient to maintain from about 1000 to 10,000 ppmw of said metals upon said regenerated catalyst exiting said reaction zone; and (b) adding in said process compounds of sodium for deposition of sodium upon said regenerated catalyst in an amount within the range of 1000 to 5000 ppmw sufficient for increasing the hydrogen yield from cracking said hydrocarbon charge.

2. The process of claim 1 wherein hydrogen is recovered as a product from said gas fraction.

3. The process of claim 1 wherein sodium compounds added to said fluidized catalytic cracking process are selected from sodium chloride, sodium hydroxide, sodium carbonate, and sodium bicarbonate.

4. The process of claim 3 wherein hydrocarbon charge to said fluidized catalytic cracking process contains compounds of nickel, vanadium, iron or mixtures thereof, and wherein spent catalyst is withdrawn and fresh catalyst is added to maintain a selected concentration of such metals upon the fluidized cracking catalyst.

* * * * *